US009023962B2

(12) United States Patent
Lu et al.

(10) Patent No.: US 9,023,962 B2
(45) Date of Patent: May 5, 2015

(54) SYNTHESIS OF HIGH MOLECULAR WEIGHT POLY(2,3,3,3-TETRAFLUOROPROPENE)

(71) Applicant: Honeywell International Inc., Morristown, NJ (US)

(72) Inventors: Changqing Lu, Snyder, NY (US); Andrew J. Poss, Kenmore, NY (US); Rajiv R. Singh, Getzville, NY (US); David Nalewajek, West Seneca, NY (US); Cheryl Cantlon, Clarence Center, NY (US)

(73) Assignee: Honeywell International Inc., Morristown, NJ (US)

( * ) Notice: Subject to any disclaimer, the term of this patent is extended or adjusted under 35 U.S.C. 154(b) by 21 days.

(21) Appl. No.: 13/789,381

(22) Filed: Mar. 7, 2013

(65) Prior Publication Data

US 2014/0051818 A1 Feb. 20, 2014

Related U.S. Application Data

(60) Provisional application No. 61/684,858, filed on Aug. 20, 2012.

(51) Int. Cl.
C08F 4/30 (2006.01)
C08F 114/18 (2006.01)

(52) U.S. Cl.
CPC ............... *C08F 4/30* (2013.01); *C08F 114/185* (2013.01)

(58) Field of Classification Search
USPC .................................. 526/234, 242
See application file for complete search history.

(56) References Cited

U.S. PATENT DOCUMENTS

| 2,599,640 | A | 6/1952 | Joyce |
| 2,919,263 | A | 12/1959 | Kahrs et al. |
| 2,970,988 | A | 2/1961 | Lo |
| 3,053,818 | A | 9/1962 | Honn et al. |
| 3,085,996 | A | 4/1963 | Lo |
| 3,240,757 | A | 3/1966 | Sterling |
| 3,893,987 | A | 7/1975 | Chandrasekaran |
| 4,464,519 | A * | 8/1984 | Mango ........................ 526/200 |
| 5,200,480 | A | 4/1993 | Maruyama et al. |
| 5,252,666 | A * | 10/1993 | Seitz et al. ...................... 525/80 |
| 5,292,816 | A | 3/1994 | Metz et al. |
| 6,342,569 | B1 | 1/2002 | Manzoni et al. |
| 7,642,314 | B2 * | 1/2010 | Gharapetian et al. ......... 524/556 |
| 7,803,890 | B2 | 9/2010 | Samuels et al. |
| 8,063,149 | B2 | 11/2011 | Samuels et al. |
| 8,163,858 | B2 | 4/2012 | Samuels et al. |
| 2004/0059079 | A1 * | 3/2004 | Vilasagar et al. ............. 526/335 |
| 2006/0281859 | A1 * | 12/2006 | Suzuki et al. ................ 524/836 |
| 2008/0153977 | A1 | 6/2008 | Samuels et al. |
| 2008/0153978 | A1 | 6/2008 | Samuels et al. |
| 2011/0097529 | A1 * | 4/2011 | Durali et al. ................. 428/36.9 |
| 2011/0257073 | A1 | 10/2011 | Flynn et al. |
| 2013/0150519 | A1 | 6/2013 | Durali et al. |

FOREIGN PATENT DOCUMENTS

| JP | 10-045811 | * | 2/1998 |
| JP | 2012-092164 A | | 5/2012 |
| WO | WO 2010/005757 A1 | | 1/2010 |
| WO | WO-2010/005757 A1 | * | 1/2010 |
| WO | 2011-122661 A1 | | 10/2011 |
| WO | WO 2011/122661 A1 | | 10/2011 |
| WO | WO-2011/122661 A1 | * | 10/2011 |
| WO | 2012-030784 A1 | | 3/2012 |

OTHER PUBLICATIONS

D.W. Brown et al., "Radiation-induced polymerization at high pressure of 2,3,3,3-tetrafluoropropene in bulk and with tetrafluoroethylene", J. Polym. Sci. A-1 Polym. Chem. (1971) 9: 1993-2007.

International Search Report regarding PCT/US2013/053759 dated Oct. 18, 2013.

* cited by examiner

*Primary Examiner* — Peter D Mulcahy
*Assistant Examiner* — Henry Hu
(74) *Attorney, Agent, or Firm* — Erika Wilson

(57) ABSTRACT

A process of synthesizing poly(2,3,3,3-tetrafluoropropene), comprising reacting 2,3,3,3-tetrafluoropropene monomers in a reaction medium in the presence of an initiator, wherein the initiator is added to the reaction medium in multiple portions at different times during the process.

19 Claims, No Drawings

US 9,023,962 B2

SYNTHESIS OF HIGH MOLECULAR WEIGHT POLY(2,3,3,3-TETRAFLUOROPROPENE)

CROSS REFERENCE TO RELATED APPLICATION

The present application claims priority under 35 U.S.C. §119(e) to U.S. Provisional Patent Application No. 61/684,858, filed on Aug. 20, 2012, the disclosure of which is incorporated herein by reference in its entirety.

FIELD OF THE INVENTION

The present technology relates to a method of synthesizing poly(2,3,3,3-tetrafluoropropene).

BACKGROUND OF THE INVENTION

Polymerized 2,3,3,3-tetrafluoropropene is a thermoplastic fluoropolymer which has demonstrated unique physical and chemical properties. These include high transparency, low surface energy, improved adhesion to a variety of substrates, relatively high chemical resistance to hydrocarbon fuels and alcohols, and good solubility in certain commonly used organic solvents, such as acetone, ethyl acetate, and THF. However, the current synthetic poly(2,3,3,3-tetrafluoropropene) has relatively low molecular weights. Certain physical properties of poly(2,3,3,3-tetrafluoropropene), such as thermal stability, hardness, anti-scratch, and brittleness, are adversely affected by the low molecular weight of the polymer.

There remains a need for improved methods of synthesizing poly(2,3,3,3-tetrafluoropropene). The present invention addresses this need.

SUMMARY OF THE INVENTION

The invention provides a process of synthesizing poly(2,3,3,3-tetrafluoropropene), comprising reacting 2,3,3,3-tetrafluoropropene monomers in a reaction medium in the presence of an initiator, wherein the initiator is added to the reaction medium in multiple portions at different times during the process.

In some embodiments of the present invention, the poly(2,3,3,3-tetrafluoropropene) has a molecular weight of more than 50,000 Daltons. In other embodiments of the present invention, the poly(2,3,3,3-tetrafluoropropene) has a molecular weight of more than 100,000 Daltons.

In certain embodiments of the present invention, the poly(2,3,3,3-tetrafluoropropene) is a homopolymer. In other embodiments of the present invention, the poly(2,3,3,3-tetrafluoropropene) is a heteropolymer.

In some embodiments of the present invention, the initiator is added to the process in more than five portions. In other embodiments of the present invention, the initiator is added to the process in more than ten portions.

In other embodiments of the present invention, the yield of the process is more than 25%.

In other embodiments of the present invention, the initiator is selected from the group consisting of $(NH_4)_2S_2O_8$, $Na_2S_2O_8$, $K_2S_2O_8$, $Fe_2(S_2O_8)_3$, $(NH_4)_2S_2O_8/Na_2S_2O_5$, $(NH_4)_2S_2O_8/FeSO_4$, $(NH_4)_2S_2O_8/Na_2S_2O_5/FeSO_4$, and combinations thereof.

DETAILED DESCRIPTION OF THE INVENTION

The homopolymerization of 2,3,3,3-tetrafluoropropene and its copolymerization with other comonomers, such as tetrafluoroethylene, vinylidene fluoride, trifluoroethylene, and chlorotrifluoroethylene, are described in U.S. Pat. Nos. 2,970,988 and 3,085,996; in U.S. Patent Publication Nos. 2008/0153977, 2008/0153978, and 2011/0097529; in International Publication Nos. WO 2010/005757 and WO 2011/122661, and in J. Polymer Sci. A: Polym. Chem. (1971) 9, 1993-2007. All of the above mentioned patent documents are incorporated herein by reference in their entirety.

The above mentioned patent documents describe only the one time addition of an initiator to the 2,3,3,3-tetrafluoropropene polymerization reaction. These described processes produce fair yields, but only relatively low molecular weight polymers. In addition, the polymer latex obtained, to be further processed, has to be coagulated and precipitated from the reaction either by freezing at low temperature, such as liquid nitrogen temperature, or by adding an electrolyte, such as concentrated hydrochloric acid.

When a small amount of an initiator is used in a polymerization reaction, high molecular weight polymer can be obtained. However, the small amount of the initiator will also result in a low yield of the polymerization.

The inventors have found a method for the polymerization of 2,3,3,3-tetrafluoropropene, resulting in poly(2,3,3,3-tetrafluoropropene), in which the initiator is added into the polymerization system in a small amounts, but in multiple portions at certain time intervals during the polymerization process. This method provides high yields of high molecular weight poly(2,3,3,3-tetrafluoropropene). Because of this high molecular weight and high yield, the produced polymer precipitates automatically from the polymerization system. Therefore, the addition of an electrolyte, such as concentrated hydrochloric acid, to coagulate polymer latex after the polymerization is avoided. The molecular weight of the poly(2,3,3,3-tetrafluoropropene) prepared by the present process ranges from 70,000 to 180,000 Dalton.

The present invention provides a process of synthesizing poly(2,3,3,3-tetrafluoropropene), comprising reacting 2,3,3,3-tetrafluoropropene monomers in a reaction medium in the presence of an initiator, wherein the initiator is added to the reaction medium in multiple portions at different times during the process.

2,3,3,3-tetrafluoropropene, as used herein, can also be described as $CF_3CF{=}CH_2$ and HFO-1234yf. Poly(2,3,3,3-tetrafluoropropene) as used herein, includes 2,3,3,3-tetrafluoropropene hetero- and homopolymers.

The synthesis of 2,3,3,3-tetrafluoropropene homopolymers and the synthesis of 2,3,3,3-tetrafluoropropene heteropolymers, using comonomers such as, but not limited to, tetrafluoroethylene, vinylidene fluoride, trifluoroethylene, and chlorotrifluoroethylene, is known in the art and not described herein in further detail. In a preferred embodiment of the present invention, the synthesis of poly(2,3,3,3-tetrafluoropropene) is conducted by an aqueous emulsion polymerization process.

In certain embodiments of the present invention, the poly(2,3,3,3-tetrafluoropropene) is a homopolymer. In other embodiments of the present invention, the poly(2,3,3,3-tetrafluoropropene) is a heteropolymer. The 2,3,3,3-tetrafluoropropene heteropolymer of the present invention may contain any of the comonomers commonly used in the art for the preparation of such heteropolymers, and in any of the generally used relative amounts. Non-limiting examples of comonomers that can be used are tetrafluoroethylene, vinylidene fluoride, trifluoroethylene, chlorotrifluoroethylene, and combinations thereof.

The polymerization may be conducted in any aqueous emulsion solution, particularly aqueous emulsion solutions that can be used in conjunction with a free radical polymerization reaction. Such aqueous emulsion solutions may include, but are not limited to, degassed deionized water, buffer compounds (such as, but not limited to, $Na_2HPO_4$/$NaH_2PO_4$), and an emulsifier (such as, but not limited to, $C_7F_{15}CO_2NH_4$, $CH_3(CH_2)_{11}OSO_3Na$, $C_{12}H_{25}C_6H_4SO_3Na$, $C_9H_{19}C_6H_4O(C_2H_4O)_{10}H$, or the like).

The polymerization is typically carried out at a temperature, pressure and length of time sufficient to produce the desired 2,3,3,3-tetrafluoropropene polymer and may be performed in any reactor known for such purposes, such as, but not limited to, an autoclave reactor.

In one non-limiting aspect, the polymerization is carried out at a temperature from about 30° C. to about 80° C. and at a pressure from about 50 psi to about 500 psi. The length of the polymerization may be any length of time to achieve the desired level of polymerization. In certain non-limiting embodiments, it may be between about 48 hours to about 700 hours. One of skill in the art will appreciate that such conditions may be modified or varied based upon the desired conversion rate and the molecular weight of the resulting 2,3,3,3-tetrafluoropropene polymers.

The respective amount of 2,3,3,3-tetrafluoropropene monomer and/or the amount of an initiator may be provided to control the conversion rate of polymerization and/or the molecular weight of the polymer produced. Generally, though not exclusively, the radical initiator is provided at a concentration of less than 1 weight percent based on the weight of the total monomer. However, the ratio of the initiator to 2,3,3,3-tetrafluoropropene monomer may be controlled to provide polymer within the desired molecular weight range.

The make-up 2,3,3,3-tetrafluoropropene monomer and the make-up initiator may be added into the polymerization system multiple times to obtain the desired polymerization yield. Generally, though not exclusively, the make-up monomer and the make-up initiator are added 5 to 15 times into the polymerization system.

One of skills in the art will appreciate that one or more of the foregoing may be adapted with additional polymerization or purification steps otherwise known in the art. To this end, the process can further include purifying the reaction product by precipitation or chromatography to obtain the product in substantially pure form. Polymerization methods may also be adapted using alternative or additional methods known and described in the art, such as, the methods described in U.S. Pat. Nos. 2,599,640; 2,919,263; 3,053,818; 3,240,757; 3,893,987; 5,200,480; 5,292,816; and 6,342,569.

The initiator of the present invention may be any of the initiators generally used in the art for the synthesis of polymers, including poly(2,3,3,3-tetrafluoropropene). In a preferred embodiment of the present invention, the initiator is a water soluble radical initiator provided in an aqueous emulsion solution. The water soluble radical initiators may include any compounds that provide free radical building blocks for 2,3,3,3-tetrafluoropropene polymerization. Such initiators include, but are not limited to, one or a combination of $(NH_4)_2S_2O_8$, $Na_2S_2O_8$, $K_2S_2O_8$, $Fe_2(S_2O_8)_3$, $(NH_4)_2S_2O_8$/$Na_2S_2O_5$, $(NH_4)_2S_2O_8$/$FeSO_4$, $(NH_4)_2S_2O_8$/$Na_2S_2O_5$/$FeSO_4$, or the like.

In preferred embodiments of the present invention, the initiator is selected from the group consisting of $(NH_4)_2S_2O_8$, $Na_2S_2O_8$, $K_2S_2O_8$, $Fe_2(S_2O_8)_3$, $(NH_4)_2S_2O_8$/$Na_2S_2O_5$, $(NH_4)_2S_2O_8$/$FeSO_4$, $(NH_4)_2S_2O_8$/$Na_2S_2O_5$/$FeSO_4$, and combinations thereof. In the most preferred embodiment of the present invention, the initiator is $(NH_4)_2S_2O_8$. The use of polymerization initiators is generally known in the art and not described herein in any detail.

In certain embodiments of the present invention, the initiator is added to the process in more than five portions. In other embodiments of the present invention, the initiator is added to the process in more than ten portions. In even other embodiments of the present invention, the initiator is added to the process in from three to five, from five to eight, and from eight to ten portions.

In certain embodiments of the present invention, the poly (2,3,3,3-tetrafluoropropene) has a molecular weight of more than 50,000 Daltons. In other embodiments of the present invention, the poly(2,3,3,3-tetrafluoropropene) has a molecular weight of more than 100,000 Daltons. The molecular weight of the polymers described herein is measured by gel permeation chromatography (GPC), which is well known in the art and therefore not described in detail herein.

In certain embodiments of the present invention, the yield of the process is more than 25%. In other embodiments of the present invention, the yield of the process is between about 20 and about 40%, between about 40 and about 50%, and between about 50 and about 65%. The process yield is determined as described in the Examples below.

In a preferred embodiment of the present invention, the polymerization of 2,3,3,3-tetrafluoropropene is carried out by emulsion polymerization method at a desired temperature in an autoclave reactor. The emulsion polymerization solution consists of degassed deionized water, buffer compounds ($Na_2HPO_4$/$NaH_2PO_4$) and emulsifier [$C_7F_{15}COO(NH_4)$]. 2,3,3,3-tetrafluoropropene is transferred into the autoclave reactor. The initiator $(NH_4)_2S_2O_8$ is added into the autoclave reactor through a syringe pump at certain time intervals during the polymerization process. The progress of the polymerization is reflected by the internal pressure reading of the autoclave reactor. After polymerization, the obtained polymer precipitate is washed with deionized water multiple times and vacuum dried. The identity of poly(2,3,3,3-tetrafluoropropene) is established by $^{19}F$ and $^1H$ NMR. The molecular weights of poly(2,3,3,3-tetrafluoropropene) are obtained by GPC measurement.

The following examples further illustrate the invention, but should not be construed to limit the scope of the invention in any way.

EXAMPLES

Example 1

Into 80 mL of degassed deionized water with stirring and nitrogen bubbling, 2.151 g of $Na_2HPO_4.7H_2O$, 0.580 g of $NaH_2PO_4$, and 2.031 g of $C_7F_{15}CO_2NH_4$ were added. 0.0538 g of $(NH_4)_2S_2O_8$ was then added into the above aqueous solution. The obtained aqueous solution was immediately transferred into an evacuated 300 mL autoclave reactor through a syringe. The reactor was cooled with dry ice and the aqueous solution inside was stirred at 100 rpm. When the internal temperature decreased to about −2° C., 118.8 g of 2,3,3,3-tetrafluoropropene was transferred into the reactor. The dry ice cooling was removed. The reactor was slowly warmed up by air. Meanwhile the stir rate was increased to 300 rpm. The autoclave reactor was further heated and the internal temperature was controlled at 65° C. The polymerization started at an autogenic pressure 259 psi.

At the end of each cycle of the polymerization, the stir rate was decreased to 100 rpm. The autoclave reactor was cooled with dry ice to about −2° C. The designated amount of make-up 2,3,3,3-tetrafluoropropene monomer (see Table 1) was transferred into the autoclave reactor, followed by the addition (via a syringe pump) of the designated amount of make-up initiator $(NH_4)_2S_2O_8$ (see Table 1) dissolved in 3 mL of degassed deionized water. The dry ice cooling was removed. The stir rate was increased to 300 rpm. The autoclave reactor was then slowly heated to 65° C. to resume the polymerization.

TABLE 1

| No. of Cycle | 1234yf (g) | $(NH_4)_2S_2O_8$ (g) | Time (h) |
|---|---|---|---|
| 1 | 118.8 | 0.0538 | 45 |
| 2 |  | 0.0542 | 40 |
| 3 | 11.6 | 0.0518 | 41 |
| 4 |  | 0.0557 | 42 |
| 5 | 11.2 | 0.0523 | 63 |
| 6 |  | 0.0537 | 45 |
| 7 | 10.5 | 0.0531 | 38 |
| Total | 152.1 | 0.3746 | 314 |

At the end of the polymerization, the heating was stopped. At room temperature, the residual monomer was slowly vented. The 2,3,3,3-tetrafluoropropene polymer precipitate was collected and thoroughly washed with deionized water. The polymer was dried under vacuum (29 in. Hg) at 40° C. to dryness. The dry polymer weighed 51.4 g to give a yield of 33.8%. The molecular weight of 2,3,3,3-tetrafluoropropene polymer measured by GPC was 94,358 Dalton.

Example 2

Into 100 mL of degassed deionized water with stirring and nitrogen bubbling, 2.125 g of $Na_2HPO_4 \cdot 7H_2O$, 0.576 g of $NaH_2PO_4$, and 2.092 g of $C_7F_{15}CO_2NH_4$ were added. 0.0536 g of $(NH_4)_2S_2O_8$ was then added into the above aqueous solution. The obtained aqueous solution was immediately transferred into an evacuated 300 mL autoclave reactor through a syringe. The reactor was cooled with dry ice and the aqueous solution inside was stirred at 100 rpm. When the internal temperature decreased to about −3° C., 121.6 g of 2,3,3,3-tetrafluoropropene was transferred into the reactor. The dry ice cooling was removed. The reactor was slowly warmed up by air. Meanwhile the stir rate was increased to 300 rpm. The autoclave reactor was further slowly heated and the internal temperature was controlled at 60° C. The polymerization started at an autogenic pressure 228 psi.

At the end of each cycle of the polymerization, the stir rate was decreased to 100 rpm. The autoclave reactor was cooled with dry ice to about −2° C. The designated amount of make-up 2,3,3,3-tetrafluoropropene monomer (see Table 2) was transferred into the autoclave reactor, followed by the addition (via a syringe pump) of the designated amount of make-up initiator $(NH_4)_2S_2O_8$ (see Table 2) dissolved in 3 mL of degassed deionized water. The dry ice cooling was removed. The stir rate was increased to 300 rpm. The autoclave reactor was then slowly heated to 60° C. to resume the polymerization.

TABLE 2

| No. of Cycle | 1234yf (g) | $(NH_4)_2S_2O_8$ (g) | Time (h) |
|---|---|---|---|
| 1 | 121.6 | 0.0536 | 45 |
| 2 |  | 0.0536 | 63 |
| 3 | 10.0 | 0.0535 | 46 |
| 4 |  | 0.0526 | 39 |
| 5 | 13.1 | 0.0551 | 65 |

TABLE 2-continued

| No. of Cycle | 1234yf (g) | $(NH_4)_2S_2O_8$ (g) | Time (h) |
|---|---|---|---|
| 6 |  | 0.0525 | 42 |
| 7 | 13.8 | 0.0557 | 72 |
| 8 | 7.5 | 0.0553 | 61 |
| 9 |  | 0.0551 | 72 |
| 10 | 10.0 | 0.0534 | 60 |
| 11 |  | 0.0522 | 66 |
| Total | 176.0 | 0.5926 | 631 |

At the end of the polymerization, the heating was stopped. At room temperature, the residual monomer was slowly vented. The 2,3,3,3-tetrafluoropropene polymer precipitate was collected and thoroughly washed with deionized water. The polymer was dried under vacuum (29 in. Hg) at 35° C. to dryness. The dry polymer weighed 111.9 g to give a yield of 63.5%. The molecular weight of 2,3,3,3-tetrafluoropropene polymer measured by GPC included two portions: 100,170 Dalton (major portion) and 12,457 Dalton (minor portion).

Example 3

Into 100 mL of degassed deionized water with stirring and nitrogen bubbling, 2.186 g of $Na_2HPO_4 \cdot 7H_2O$, 0.580 g of $NaH_2PO_4$, and 2.073 g of $C_7F_{15}CO_2NH_4$ were added. 0.1040 g of $(NH_4)_2S_2O_8$ was then added into the above aqueous solution. The obtained aqueous solution was immediately transferred into an evacuated 300 mL autoclave reactor through a syringe. The reactor was cooled with dry ice and the aqueous solution inside was stirred at 100 rpm. When the internal temperature decreased to about −3° C., 114.1 g of 2,3,3,3-tetrafluoropropene was transferred into the reactor. The dry ice cooling was removed. The reactor was slowly warmed up by air. Meanwhile the stir rate was increased to 300 rpm. The autoclave reactor was further slowly heated and the internal temperature was controlled at 70° C. The polymerization started at an autogenic pressure 309 psi.

At the end of each cycle of the polymerization, the stir rate was decreased to 100 rpm. The autoclave reactor was cooled with dry ice to about −3° C. The designated amount of make-up 2,3,3,3-tetrafluoropropene monomer (see Table 3) was transferred into the autoclave reactor, followed by the addition (via a syringe pump) of the designated amount of make-up initiator $(NH_4)_2S_2O_8$ (see Table 3) dissolved in 3 mL of degassed deionized water. The dry ice cooling was removed. The stir rate was increased to 300 rpm. The autoclave reactor was then slowly heated to 70° C. to resume the polymerization.

TABLE 3

| No. of Cycle | 1234yf (g) | $(NH_4)_2S_2O_8$ (g) | Time (h) |
|---|---|---|---|
| 1 | 114.1 | 0.1040 | 39 |
| 2 | 11.0 | 0.1046 | 50 |
| 3 | 15.5 | 0.1091 | 41 |
| 4 |  | 0.1063 | 41 |
| 5 | 15.3 | 0.1045 | 69 |
| 6 |  | 0.1066 | 47 |
| Total | 155.9 | 0.6351 | 287 |

At the end of the polymerization, the heating was stopped. At room temperature, the residual monomer was slowly vented. The 2,3,3,3-tetrafluoropropene polymer precipitate was collected and thoroughly washed with deionized water. The polymer was dried under vacuum (29 in. Hg) at 35° C. to dryness. The dry polymer weighed 88.7 g to give a yield of 56.9%. The molecular weight of 2,3,3,3-tetrafluoropropene polymer measured by GPC included two portions: 86,955 Dalton (major portion) and 11,556 Dalton (minor portion).

Example 4

Into 80 mL of degassed deionized H2O with stirring and nitrogen bubbling, 2.116 g of $Na_2HPO_4.7H_2O$, 0.579 g of $NaH_2PO_4$, and 2.028 g of $C_7F_{15}CO_2NH_4$ were added. 0.0563 g of $(NH4)_2S_2O_8$ was added into above aqueous solution with stirring and nitrogen bubbling. The obtained aqueous solution was immediately transferred into an evacuated 300 mL autoclave reactor through a syringe. The reactor was cooled with dry ice and the aqueous solution inside was stirred at 100 rpm. When the internal temperature decreased to about −2° C., 113.5 g of 2,3,3,3-tetrafluoropropene was transferred into the reactor. The dry ice cooling was removed. The reactor was slowly warmed up by air to about 15° C. The stir rate was increased to 300 rpm. 0.0233 g of $FeSO_4.7H_2O$ dissolved 3 mL degassed deionized water was pumped in the autoclave reactor. The autoclave reactor was then slowly heated and the internal temperature was controlled at 50° C. The polymerization started at an autogenic pressure 157 psi.

At the end of each cycle of the polymerization, the stir rate was decreased to 100 rpm. The autoclave reactor was cooled with dry ice to about −2° C. The designated amount of make-up 2,3,3,3-tetrafluoropropene monomer (see Table 4) was transferred into the autoclave reactor, followed by the addition (via a syringe pump) of the designated amount of make-up initiator $(NH_4)_2S_2O_8$ (see Table 4) dissolved in 2 mL of degassed deionized water. The dry ice cooling was removed. The stir rate was increased to 300 rpm. The autoclave reactor was warmed up by air to about 15° C., followed by the addition of the designated amount of make-up $FeSO_4.7H_2O$ (see Table 4) dissolved in 2 mL of degassed deionized water. The autoclave reactor was slowly heated to 50° C. to resume the polymerization.

TABLE 4

| No. of Cycle | 1234yf (g) | $(NH_4)_2S_2O_8$ (g) | $FeSO_4 \cdot 7H_2O$ (g) | Time (h) |
| --- | --- | --- | --- | --- |
| 1 | 113.5 | 0.0563 | 0.0233 | 50 |
| 2 | 11.8 | 0.0553 | 0.0256 | 67 |
| 3 | 11.1 | 0.0557 | 0.0271 | 72 |
| 4 | 11.6 | 0.0541 | 0.0271 | 75 |
| 5 | 10.6 | 0.0516 | 0.0243 | 72 |
| 6 | 10.1 | 0.0539 | 0.0241 | 49 |
| 7 |  | 0.0539 | 0.0267 | 62 |
| Total | 168.7 | 0.3804 | 0.1782 | 447 |

At the end of the polymerization, the heating was stopped. At room temperature, the residual monomer was slowly vented. The 2,3,3,3-tetrafluoropropene polymer precipitate was collected and thoroughly washed with deionized water. The polymer was dried under vacuum (29 in. Hg) at 35° C. to dryness. The dry polymer weighed 48.6 g to give a yield of 28.8%. The molecular weight of 2,3,3,3-tetrafluoropropene polymer measured by GPC included two portions: 159,480 Dalton (minor portion) and 17,440 Dalton (major portion).

What is claimed is:

1. A process of synthesizing poly(2,3,3,3-tetrafluoropropene), comprising reacting 2,3,3,3-tetrafluoropropene monomers in a reaction medium in the presence of an initiator, wherein more of the same initiator is added to the reaction medium in multiple portions comprising at least three initiator additions of approximately equal amounts, and at spaced apart times during the reaction process;
wherein the reaction time ranges from about 48 hours to about 700 hours; and
wherein the molecular weight of the poly(2,3,3,3-tetrafluoropropene) produced during the reaction ranges from 50,000 to 180,000 Dalton as measured by gel permeation chromatography (GPC).

2. The process of claim 1, wherein the poly(2,3,3,3-tetrafluoropropene) has a molecular weight of more than 50,000 Daltons.

3. The process of claim 2, wherein the poly(2,3,3,3-tetrafluoropropene) has a molecular weight of more than 100,000 Daltons.

4. The process of claim 3, wherein the poly(2,3,3,3-tetrafluoropropene) is a homopolymer.

5. The process of claim 3, wherein the poly(2,3,3,3-tetrafluoropropene) is a copolymer.

6. The process of claim 3, wherein the initiator is added to the process in more than five additional portions.

7. The process of claim 6, wherein the initiator is added to the process in more than ten additional portions.

8. The process of claim 3, wherein the yield of the process is more than 25%.

9. The process of claim 3, wherein the initiator is selected from the group consisting of $(NH_4)_2S_2O_8$, $Na_2S_2O_8$, $K_2S_2O_8$, $Fe_2(S_2O_8)_3$, $(NH_4)_2S_2O_8/Na_2S_2O_5$, $(NH_4)_2S_2O_8/FeSO_4$, $(NH_4)_2 S_2O_8/Na_2S_2O_5/FeSO_4$, and combinations thereof.

10. A process of synthesizing poly(2,3,3,3-tetrafluoropropene), consisting of reacting 2,3,3,3-tetrafluoropropene monomers in a reaction medium in the presence of an initiator,
wherein more of the same initiator is added to the reaction medium in at least three additional portions of approximately equal amounts, and at spaced apart times during the reaction process;
wherein the reaction time ranges from about 48 hours to about 700 hours; and
wherein the molecular weight of the poly(2,3,3,3-tetrafluoro-propene) produced during the reaction ranges from 50,000 to 180,000 Dalton as measured by gel permeation chromatography (GPC).

11. The process of claim 10, wherein the poly(2,3,3,3-tetra-fluoropropene) has a molecular weight of more than 50,000 Daltons.

12. The process of claim 10, wherein the poly(2,3,3,3-tetra-fluoropropene) has a molecular weight of more than 100,000 Daltons.

13. The process of claim 10, wherein the poly(2,3,3,3-tetrafluoropropene) is a homopolymer.

14. The process of claim 10, wherein the poly(2,3,3,3-tetra-fluoropropene) is a copolymer.

15. The process of claim 10, wherein the initiator is added to the process in more than five additional portions.

16. The process of claim 10, wherein the initiator is added to the process in more than ten additional portions.

17. The process of claim 10, wherein the yield of the process is more than 25%.

18. The process of claim 10, wherein the initiator is selected from the group consisting of $(NH_4)_2S_2O_8$, $Na_2S_2O_8$, $K_2S_2O_8$, $Fe_2(S_2O_8)_3$, $(NH_4)_2S_2O_8/Na_2S_2O_5$, $(NH_4)_2S_2O_8/FeSO_4$, $(NH_4)_2 S_2O_8/Na_2S_2O_5/FeSO_4$, and combinations thereof.

19. A process of synthesizing poly(2,3,3,3-tetrafluoropropene), comprising reacting 2,3,3,3-tetrafluoropropene monomers in a reaction medium in the presence of an initiator selected from the group consisting of $(NH_4)_2S_2O_8$, $Na_2S_2O_8$, $K_2S_2O_8$, $Fe_2(S_2O_8)_3$, $(NH_4)_2S_2O_8/Na_2S_2O_5$, $(NH_4)_2S_2O_8/FeSO_4$,
$(NH_4)_2 S_2O_8/Na_2S_2O_5/FeSO_4$, and combinations thereof,
wherein more of the same initiator is added to the reaction medium in multiple portions comprising at least five initiator additions of approximately equal amounts, and at spaced apart times during the reaction process;
wherein the reaction time ranges from about 48 hours to about 700 hours; and
wherein the molecular weight of the poly(2,3,3,3-tetrafluoropropene) produced during the reaction ranges from 50,000 to 180,000 Dalton as measured by gel permeation chromatography (GPC).

* * * * *